(12) United States Patent
Billmaier et al.

(10) Patent No.: US 7,594,246 B1
(45) Date of Patent: Sep. 22, 2009

(54) SYSTEM AND METHOD FOR FOCUSED NAVIGATION WITHIN A USER INTERFACE

(75) Inventors: James A. Billmaier, Woodinville, WA (US); John M. Kellum, Seattle, WA (US); Dewey Reid, San Rafael, CA (US); Philip Rogan, Bozeman, MT (US)

(73) Assignee: Vulcan Ventures, Inc., Seattle, WA (US)

( * ) Notice: Subject to any disclaimer, the term of this patent is extended or adjusted under 35 U.S.C. 154(b) by 1411 days.

(21) Appl. No.: 10/108,178

(22) Filed: Mar. 27, 2002

Related U.S. Application Data

(63) Continuation-in-part of application No. 10/097,174, filed on Mar. 12, 2002, now abandoned.

(60) Provisional application No. 60/324,997, filed on Sep. 26, 2001, provisional application No. 60/317,612, filed on Sep. 6, 2001, provisional application No. 60/315,731, filed on Aug. 29, 2001.

(51) Int. Cl.
*G06F 3/00* (2006.01)
*G06F 13/00* (2006.01)
*H04N 5/445* (2006.01)

(52) U.S. Cl. .................. 725/52; 725/37; 725/40; 725/44; 725/60; 725/61

(58) Field of Classification Search .......... 725/52
See application file for complete search history.

(56) References Cited

U.S. PATENT DOCUMENTS

| | | | |
|---|---|---|---|
| 5,398,074 A | 3/1995 | Duffield et al. ............. 348/564 |
| 5,524,195 A | 6/1996 | Clanton, III et al. ........ 395/155 |
| 5,583,560 A | 12/1996 | Florin et al. | |
| 5,585,838 A | 12/1996 | Lawler et al. | |
| 5,602,596 A | 2/1997 | Claussen et al. ............ 348/564 |
| 5,606,374 A | 2/1997 | Bertram ...................... 348/565 |
| 5,619,249 A | 4/1997 | Billock et al. | |
| 5,621,456 A | 4/1997 | Florin et al. .................. 348/7 |
| 5,623,613 A | 4/1997 | Rowe et al. ................ 395/353 |
| 5,633,657 A * | 5/1997 | Falcon ........................ 345/157 |

(Continued)

FOREIGN PATENT DOCUMENTS

EP   1 028 570  A1   8/2000

(Continued)

OTHER PUBLICATIONS

Nokia Mediaterminal 511S; www.nokia.com/multimedia/pdf/mediaterminal.pdf; pp. 1-12; Dec. 11, 2001.

(Continued)

*Primary Examiner*—Christopher Kelley
*Assistant Examiner*—Justin E Shepard
(74) *Attorney, Agent, or Firm*—Kory D. Christensen; Stoel Rives LLP

(57) ABSTRACT

A sequence of cards is stored that graphically represents available options within an information system. In response to a single user action, the sequence of cards is successively displayed within a focus area of the user interface. In response to a subsequent user action, the successive display is discontinued to display a particular card representing a selected option.

38 Claims, 11 Drawing Sheets

U.S. PATENT DOCUMENTS

| | | | |
|---|---|---|---|
| 5,663,757 A | 9/1997 | Morales | 348/13 |
| 5,673,401 A | 9/1997 | Volk et al. | 395/327 |
| 5,677,708 A | 10/1997 | Matthews, III et al. | 345/115 |
| 5,682,511 A | 10/1997 | Sposato et al. | 395/353 |
| 5,781,872 A * | 7/1998 | Konishi et al. | 701/36 |
| 5,805,763 A * | 9/1998 | Lawler et al. | 386/83 |
| 5,812,124 A | 9/1998 | Eick et al. | 345/327 |
| 5,838,326 A | 11/1998 | Card et al. | 345/355 |
| 5,850,218 A | 12/1998 | LaJoie et al. | 345/327 |
| 5,966,126 A | 10/1999 | Szabo | |
| 6,002,394 A | 12/1999 | Schein et al. | |
| 6,005,601 A | 12/1999 | Ohkura et al. | 348/7 |
| 6,020,930 A | 2/2000 | Legrand | 348/569 |
| 6,028,600 A | 2/2000 | Rosin et al. | 345/327 |
| 6,037,933 A | 3/2000 | Blonstein et al. | 345/327 |
| 6,046,722 A | 4/2000 | McKiel, Jr. | 345/145 |
| 6,118,492 A | 9/2000 | Milnes et al. | |
| 6,151,059 A | 11/2000 | Schein et al. | 348/13 |
| 6,163,345 A | 12/2000 | Noguchi et al. | 348/564 |
| 6,175,362 B1 | 1/2001 | Harms et al. | 345/327 |
| 6,177,931 B1 | 1/2001 | Alexander et al. | |
| 6,188,406 B1 | 2/2001 | Fong et al. | 345/348 |
| 6,201,540 B1 | 3/2001 | Gallup et al. | |
| 6,262,722 B1 | 7/2001 | Allison et al. | 345/327 |
| 6,266,098 B1 | 7/2001 | Cove et al. | 348/563 |
| 6,281,940 B1 | 8/2001 | Sciammarella | 348/564 |
| 6,295,062 B1 | 9/2001 | Tada et al. | 345/348 |
| 6,326,962 B1 | 12/2001 | Szabo | |
| 6,344,880 B1 | 2/2002 | Takahashi et al. | 348/563 |
| 6,347,400 B1 | 2/2002 | Ohkura et al. | |
| 6,357,043 B1 * | 3/2002 | Ellis et al. | 725/61 |
| 6,425,129 B1 * | 7/2002 | Sciammarella et al. | 725/38 |
| 6,445,306 B1 | 9/2002 | Trovato et al. | |
| 6,452,607 B1 | 9/2002 | Livingston | |
| 6,453,471 B1 | 9/2002 | Klosterman | |
| 6,462,784 B1 * | 10/2002 | Kohno et al. | 348/563 |
| 6,481,011 B1 | 11/2002 | Lemmons | |
| 6,522,342 B1 * | 2/2003 | Gagnon et al. | 715/716 |
| 6,535,888 B1 | 3/2003 | Vijayan et al. | |
| 6,536,041 B1 | 3/2003 | Knudson et al. | |
| 6,538,672 B1 | 3/2003 | Dobbelaar | 345/810 |
| 6,551,107 B1 | 4/2003 | Buckley et al. | |
| 6,564,378 B1 | 5/2003 | Satterfield et al. | |
| 6,577,350 B1 | 6/2003 | Proehl et al. | 348/564 |
| 6,613,100 B2 | 9/2003 | Miller | 715/526 |
| 6,642,939 B1 | 11/2003 | Vallone et al. | 345/721 |
| 6,665,873 B1 * | 12/2003 | Van Gestel et al. | 725/136 |
| 6,678,891 B1 * | 1/2004 | Wilcox et al. | 725/42 |
| 6,690,391 B1 | 2/2004 | Proehl et al. | 345/720 |
| 6,698,021 B1 | 2/2004 | Amini et al. | |
| 6,725,215 B2 | 4/2004 | Yamamoto | |
| 6,728,675 B1 | 4/2004 | Maddalozzo, Jr. et al. | 704/258 |
| 6,756,997 B1 * | 6/2004 | Ward et al. | 715/716 |
| 6,765,590 B1 | 7/2004 | Watahiki et al. | |
| 6,769,128 B1 * | 7/2004 | Knee et al. | 725/43 |
| 6,782,409 B1 | 8/2004 | Yoskida | |
| 6,789,263 B1 | 9/2004 | Shimada et al. | |
| 6,791,548 B2 | 9/2004 | Dutta et al. | |
| 6,792,617 B2 | 9/2004 | Gorbatov et al. | |
| 6,826,351 B1 * | 11/2004 | Tsujisawa et al. | 386/83 |
| 6,829,639 B1 | 12/2004 | Lawson et al. | |
| 6,868,169 B2 | 3/2005 | Staas et al. | |
| 6,901,603 B2 * | 5/2005 | Zeidler et al. | 725/39 |
| 6,931,198 B1 | 8/2005 | Hamada et al. | |
| 6,934,917 B2 | 8/2005 | Lin | 715/811 |
| 6,966,065 B1 | 11/2005 | Kitazato et al. | |
| 6,976,228 B2 * | 12/2005 | Bernhardson | 715/830 |
| 6,978,472 B1 * | 12/2005 | Nashida et al. | 725/52 |
| 7,065,710 B2 | 6/2006 | Hayashi et al. | |
| 7,133,730 B1 | 11/2006 | Katayama et al. | |
| 7,139,983 B2 | 11/2006 | Kelts | |
| 7,191,245 B2 | 3/2007 | Takayama | |
| 7,260,829 B1 | 8/2007 | Hendricks et al. | |
| 2001/0013126 A1 | 8/2001 | Lemmons et al. | |
| 2002/0033848 A1 | 3/2002 | Sciammarella et al. | 345/838 |
| 2002/0044226 A1 | 4/2002 | Risi | |
| 2002/0049972 A1 | 4/2002 | Kimoto | |
| 2002/0054068 A1 | 5/2002 | Ellis et al. | |
| 2002/0056129 A1 | 5/2002 | Blackketter et al. | 725/112 |
| 2002/0070958 A1 | 6/2002 | Yeo et al. | 345/723 |
| 2002/0075269 A1 | 6/2002 | Dutta et al. | |
| 2002/0076679 A1 | 6/2002 | Aman | |
| 2002/0078440 A1 | 6/2002 | Feinberg et al. | 725/9 |
| 2002/0097894 A1 | 7/2002 | Staas et al. | |
| 2002/0144264 A1 | 10/2002 | Broadus | |
| 2002/0152474 A1 | 10/2002 | Dudkiewicz | 725/136 |
| 2002/0157099 A1 | 10/2002 | Schrader et al. | |
| 2002/0166122 A1 | 11/2002 | Kikinis et al. | |
| 2002/0174444 A1 | 11/2002 | Gatto et al. | |
| 2002/0178212 A1 | 11/2002 | Sirhall | |
| 2002/0184634 A1 | 12/2002 | Cooper | |
| 2003/0001898 A1 | 1/2003 | Bernhardson | 345/786 |
| 2003/0001907 A1 | 1/2003 | Bergsten et al. | |
| 2003/0052900 A1 | 3/2003 | Card et al. | |
| 2003/0063798 A1 | 4/2003 | Li et al. | |
| 2003/0084452 A1 | 5/2003 | Ryan et al. | |
| 2003/0090524 A1 | 5/2003 | Segerberg et al. | 345/786 |
| 2003/0093792 A1 | 5/2003 | Labeeb et al. | 725/46 |
| 2003/0117440 A1 | 6/2003 | Hellyar et al. | |
| 2003/0233654 A1 | 12/2003 | Tsukamoto et al. | |
| 2004/0068740 A1 | 4/2004 | Fukuda et al. | |
| 2004/0125138 A1 | 7/2004 | Jetha et al. | |
| 2004/0125447 A1 | 7/2004 | Sato et al. | |
| 2004/0183830 A1 | 9/2004 | Cody et al. | |
| 2004/0210601 A1 | 10/2004 | Takayama | |
| 2005/0005241 A1 | 1/2005 | Hunleth et al. | |
| 2005/0021729 A1 | 1/2005 | Yoshida | |
| 2005/0024535 A1 | 2/2005 | Tatemori et al. | |
| 2005/0110909 A1 | 5/2005 | Staunton et al. | |
| 2005/0160377 A1 | 7/2005 | Sciammarella et al. | |
| 2005/0172319 A1 * | 8/2005 | Reichardt et al. | 725/52 |
| 2005/0193408 A1 | 9/2005 | Sull et al. | |
| 2005/0193425 A1 | 9/2005 | Sull et al. | |
| 2005/0204385 A1 | 9/2005 | Sull et al. | |
| 2005/0228671 A1 | 10/2005 | Olorenshaw et al. | |
| 2005/0240964 A1 | 10/2005 | Barrett | |
| 2005/0243364 A1 | 11/2005 | Sakai | |
| 2005/0278759 A1 | 12/2005 | Unger | |
| 2005/0283810 A1 | 12/2005 | Ellis et al. | |
| 2006/0093199 A1 | 5/2006 | Fram et al. | |
| 2006/0117370 A1 | 6/2006 | Kitazato et al. | |
| 2006/0238546 A1 | 10/2006 | Handley et al. | |
| 2006/0288325 A1 | 12/2006 | Miyamoto et al. | |
| 2007/0006043 A1 | 1/2007 | Pins | |

FOREIGN PATENT DOCUMENTS

| | | |
|---|---|---|
| KR | 10-2002-0013868 | 2/2002 |
| WO | WO 00/33566 | 6/2000 |
| WO | WO 00/65429 | 11/2000 |

OTHER PUBLICATIONS

Nokia Mediamaster 9470S; http://www.digitv.de/ifa01/nokia9470s.shtml;pp. 1-2; Dec. 11, 2001.
U.S. Appl. No. 10/097,174, filed Mar. 12, 2002, Billmaier et al.
U.S. Appl. No. 10/105,088, filed Mar. 22, 2002, Billmaier.
U.S. Appl. No. 10/105,083, filed Mar. 22, 2002, Billmaier.
U.S. Appl. No. 10/097,195, filed Mar. 12, 2002, Billmaier et al.
U.S. Appl. No. 10/113,889, filed Mar. 29, 2002, Billmaier et al.
U.S. Appl. No. 10/107,601, filed Mar. 27, 2002, Billmaier et al.
U.S. Appl. No. 10/113,820, filed Mar. 29, 2002, Billmaier et al.
U.S. Appl. No. 10/186,209, filed Jun. 27, 2002, Istvan et al.
U.S. Appl. No. 10/186,210, filed Jun. 27, 2002, Billmaier et al.
U.S. Appl. No. 10/230,964, filed Aug. 29, 2002, Istvan et al.

U.S. Appl. No. 10/260,700, filed Sep. 30, 2002, Billmaier et al.
U.S. Appl. No. 10/270,738, filed Sep. 30, 2002, Billmaier et al.
U.S. Appl. No, 10/260,208, filed Sep. 30, 2002, Billmaier et al.
U.S. Appl. No. 10/328,754, filed Dec. 23, 2002, Rappaport et al.
U.S. Appl. No. 10/259,199, filed Sep. 27, 2002, Young et al.
U.S. Appl. No. 10/138,810, filed May 3, 2002, Billmaier et al.
U.S. Appl. No. 10/138,805, filed May 3, 2002, Billmaier et al.
U.S. Appl. No. 10/138,803, filed May 3, 2002, Billmaier et al.
U.S. Appl. No. 10/183,804, filed May 3, 2002, Billmaier et al.
U.S. Appl. No. 60/317,612, filed Sep. 6, 2001, Reid et al.
U.S. Appl. No. 60/324,997, filed Sep. 26, 2001, Reid et al.
U.S. Appl. No. 10/186,094, filed Jun. 29, 2002, Billmaier et al.
U.S. Appl. No. 10/187,118, filed Jun. 29, 2002, Billmaier et al.
U.S. Appl. No. 10/186,095, filed Jun. 29, 2002, Billmaier et al.
U.S. Appl. No. 60/377,627, filed May 3, 2002, Billmaier et al.
U.S. Appl. No. 29/161,708, filed Jun. 3, 2002, Nguyen et al.
U.S. Appl. No. 10/251,366, filed Sep. 20, 2002, Allen et al.
U.S. Appl. No. 10/260,881, filed Sep. 30, 2002, Allen et al.
U.S. Appl. No. 10/320,900, filed Dec. 16, 2002, Kolde et al.
U.S. Appl. No. 10/328,514, filed Dec. 23, 2002, Kolde et al.
U.S. Appl. No. 10/260,738, filed Sep. 30, 2002, Billmaier et al.
Donovan-Jaaskelainen, Color Cues for File Position and Edit Tracing, Feb. 1, 1993, IBM_TDB, TDB v36 n2 Feb. 1993 pp. 273-274.
Office Action mailed Oct. 19, 2006, for U.S. Appl. No. 10/097,174, filed Mar. 12, 2002.
Office Action mailed May 4, 2007, for U.S. Appl. No. 10/097,174, filed Mar. 12, 2002.
Office Action mailed Jan. 11, 2007, for U.S. Appl. No. 10/105,088, filed Mar. 22, 2002.
Office Action mailed Jul. 6, 2007, for U.S. Appl. No. 10/105,088, filed Mar. 22, 2002.
Office Action mailed Jan. 3, 2007, for U.S. Appl. No. 10/113,889, filed Mar. 29, 2002.
Office Action mailed Jun. 15, 2007, for U.S. Appl. No. 10/113,889, filed Mar. 29, 2002.
Office Action mailed Nov. 29, 2006, for U.S. Appl. No. 10/107,601, filed Mar. 27, 2002.
Office Action mailed Jun. 20, 2007, for U.S. Appl. No. 10/107,601, filed Mar. 27, 2002.
Office Action mailed May 24, 2007, for U.S. Appl. No. 10/186,209, filed Jun. 27, 2002.
Office Action mailed Jul. 5, 2007, for U.S. Appl. No. 10/186,210, filed Jun. 27, 2002.
Office Action mailed Jun. 29, 2007, for U.S. Appl. No. 10/328,754, filed Dec. 23, 2002.
Office Action mailed Dec. 13, 2007, for U.S. Appl. No. 10/186,209, filed Jun. 27, 2002.
Office Action mailed Dec. 13, 2007, for U.S. Appl. No. 10/186,210, filed Jun. 27, 2002.
Office Action mailed Dec. 13, 2007, for U.S. Appl. No. 10/113,889, filed Mar. 29, 2002.
Office Action mailed Dec. 26, 2007, for U.S. Appl. No. 10/105,088, filed Mar. 22, 2002.
Office Action mailed Jan. 22, 2008, for U.S. Appl. No. 10/260,738, filed Sep. 30, 2002.
Office Action mailed Mar. 5, 2008, for U.S. Appl. No. 10/328,754, filed Dec. 23, 2002.
Office Action mailed Jul. 29, 2008 in U.S. Appl. No. 10/097,174, filed Mar. 12, 2002.
Office Action mailed Jul. 3, 2008 in U.S. Appl. No. 10/105,088, filed Mar. 22, 2002.
Notice of Allowance mailed Oct. 29, 2008 in U.S. Appl. No. 10/113,889, filed Mar. 29, 2002.
Office Action mailed Apr. 27, 2009 in U.S. Appl. No. 10/186,209, filed Jun. 27, 2002.
Office Action mailed Feb. 18, 2009 in U.S. Appl. No. 10/186,210, filed Jun. 27, 2002.
Office Action mailed Aug. 4, 2008 in U.S. Appl. No. 10/186,210, filed Jun. 27, 2002.
Supplemental Notice of Allowability in U.S. Appl. No. 10/260,700, filed Sep. 30, 2002.
Office Action mailed Apr. 27, 2009 in U.S. Appl. No. 10/260,740, filed Sep. 30, 2002.
Office Action mailed Sep. 11, 2008 in U.S. Appl. No. 10/260,738, filed Sep. 30, 2002.
Office Action mailed Apr. 14, 2009 in U.S. Appl. No. 10/328,754, filed Dec. 23, 2002.
Office Action mailed Sep. 3, 2008 in U.S. Appl. No. 10/328,754, filed Dec. 23, 2002.
Office Action mailed Apr. 14, 2009 in U.S. Appl. No. 11/426,183, filed Jun. 23, 2006.

* cited by examiner

SYSTEM AND METHOD FOR FOCUSED NAVIGATION WITHIN A USER INTERFACE

RELATED APPLICATIONS

This application is a continuation-in-part of U.S. patent application Ser. No. 10/097,174, filed Mar. 12, 2002 now abandoned, for "System and Method for Focused Navigation within an Interactive Television User Interface." The present application is also related to and claims the benefit of U.S. Provisional Application No. 60/315,731, filed Aug. 29, 2001, entitled "System and Method for Visual Channel Surfing", which is hereby incorporated by reference in its entirety. The present application is further related to and claims the benefit of U.S. Provisional Application No. 60/317,612, filed Sep. 6, 2001, entitled "System and Method for Visual Channel Surfing", which is hereby incorporated by reference in its entirety. The present application is also related to and claims the benefit of U.S. Provisional Application No. 60/324,997, filed Sep. 26, 2001, entitled "System and Method for Visual Channel Surfing Using Center-Focused Navigation", which is hereby incorporated by reference in its entirety.

BACKGROUND

1. Field of the Invention

The present invention relates generally to the field of information systems. More specifically, the present invention relates to a system and method for focused navigation within a user interface of an information system.

2. Description of Related Background Art

Recent advances in technology have vastly increased the number of available options within personal computers (PCs), interactive television (ITV) systems, personal digital assistant (PDAs), cellular telephones, and other information systems. For instance, current ITV systems offer hundreds of broadcast channels and a variety of interactive options, including e-mail, videoconferencing, instant messaging, online banking, online purchasing, and so forth.

Unfortunately, despite technological advances, user interfaces for these systems have remained largely unchanged, making navigation through all of the newly available options no easy task. For example, a user of a modern ITV system must scan through potentially hundreds of channels and other options, often by repeatedly pressing a button on a remote control. Such an outdated approach is far too slow and inconvenient to facilitate effective operation of a modern ITV system.

Similar problems exist with PC interfaces. The graphical user interface (GUI) of a modern PC looks remarkably similar to the first GUI developed twenty years ago. Small icons representing user options are arranged in rows and columns on a graphical representation of a desktop. Many of the icons are identical, requiring the addition of text labels as a distinguishing feature. Typically, a user must individually examine each icon and read each label—a time-consuming process that does not lend itself to effective navigation of the numerous options available in a modern PC.

Accordingly, it would be an advancement in the art to provide a user interface that allows for rapid and efficient navigation of a plurality of options without the drawbacks of conventional approaches. In particular, it would be an advancement in the art to provide an interface in which a user need not repeatedly press a button to display each available option, as is often the case with conventional TV or ITV interfaces. Likewise, it would be an advancement in the art to provide an interface in which a user need not scan through an arrangement of multiple icons, as is the case in many conventional PC interfaces.

BRIEF DESCRIPTION OF THE DRAWINGS

Non-exhaustive embodiments of the invention are described with reference to the figures, in which.

DETAILED DESCRIPTION OF THE PREFERRED EMBODIMENTS

Reference throughout this specification to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the following description makes particular reference to ITV systems, it should be recognized that the present invention may be used in conjunction with any type of information system in which selectable options may be displayed on a display screen. Examples of such information systems include, but are not limited to, ITV systems, personal computers, and mobile computing devices, such as PDAs, webpads, cellular telephones, and the like.

Figure 1:
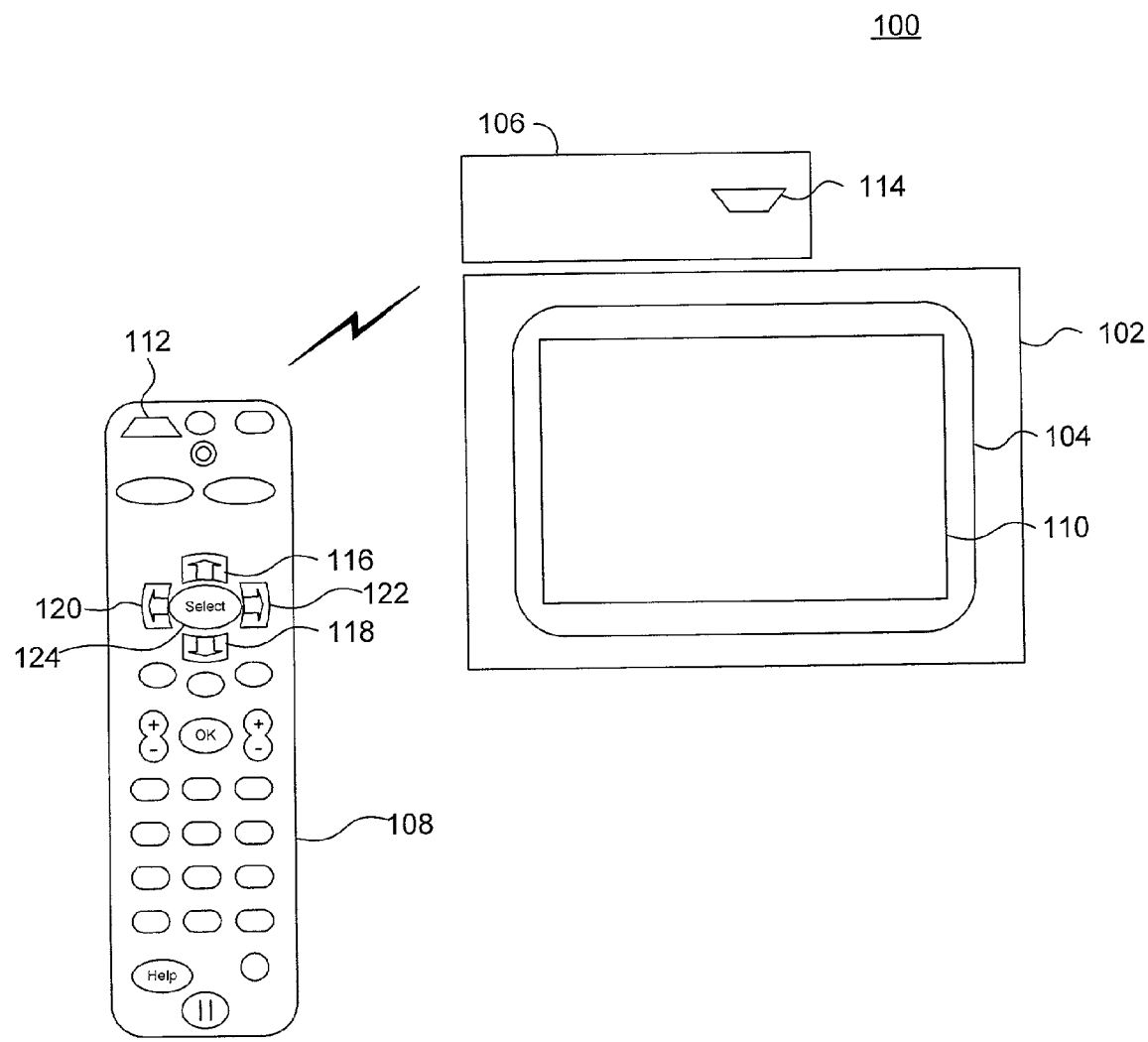
FIG. 1 is a block diagram of an ITV system.

Referring now to FIG. 1, there is shown a block diagram of an ITV system 100 according to an embodiment of the invention. In one configuration, the ITV system 100 includes a television (TV) 102 or other display device having a display screen 104, a set-top box (STB) 106, and a remote control 108.

The STB 106 serves as a gateway between the TV 102 and a broadband communication network (not shown), such as a cable television network or a direct broadcast satellite (DBS) network. One commercially-available example of an STB 106 is the Motorola DCT5000 interactive set-top terminal.

The STB 106 receives encoded television signals and other data from the broadband network and processes the same for display on the display screen 104. The STB 106 may also include hardware and software for presenting a graphical user interface (GUI) 110 on the display screen 104 for operating the various functions and services of the STB 106.

In alternative embodiments, the STB 106 may be integrated into the TV 102, a mobile computing device, or the like. In still other embodiments, the term "STB" may broadly encompass a personal computer (PC) that performs STB-like functions. In such an embodiment, a PC may be used to process TV signals and other data received from the broadband network. The PC may operate in the context of a home network to provide display signals to a variety of devices, including one or more television sets, computer monitors, personal digital assistants (PDAs), cellular phones, and the like. A variety of home networking systems and protocols may be used, such as Ethernet, 802.11b, Bluetooth, etc.

The remote control 108 is provided for convenient remote operation of the STB 106 and the TV 102. The remote control 108 may include a wireless transmitter 112 for transmitting control signals to a wireless receiver 114 within the STB 106 using radio frequency (RF) or infrared (IR) techniques.

In addition, the remote control 108 may include a number of buttons or other similar controls. For instance, the remote control 108 may include a "Up" button 116, a "Down" button 118, a "Left" button 120, a "Right" button 122, and a "Select" button 124. Of course, a variety of other buttons or controls may be provided within the scope of the invention. In alternative implementations, the remote control 108 may be embodied as a keyboard (wireless or wired) with a standard set of alphanumeric keys, a mouse, or other suitable input device.

As noted, an ITV system 100 typically provides access to a plurality of selectable options, such as channels, programs, applications, digital media files, etc. For instance, an ITV system 100 may provide access to literally hundreds of broadcast TV channels, pay-per-view (PPV) channels, music channels, and the like. Additionally, an ITV system 100 may provide access to a number of interactive channels or applications, including web browsers, e-mail programs, chat clients, personal video recorder (PVR) applications, contact directories, and the like. Furthermore, an ITV system 100 may store or provide access to stored PVR recordings, digital photographs, audio (MP3) files, or other forms of digital media.

Figure 2:
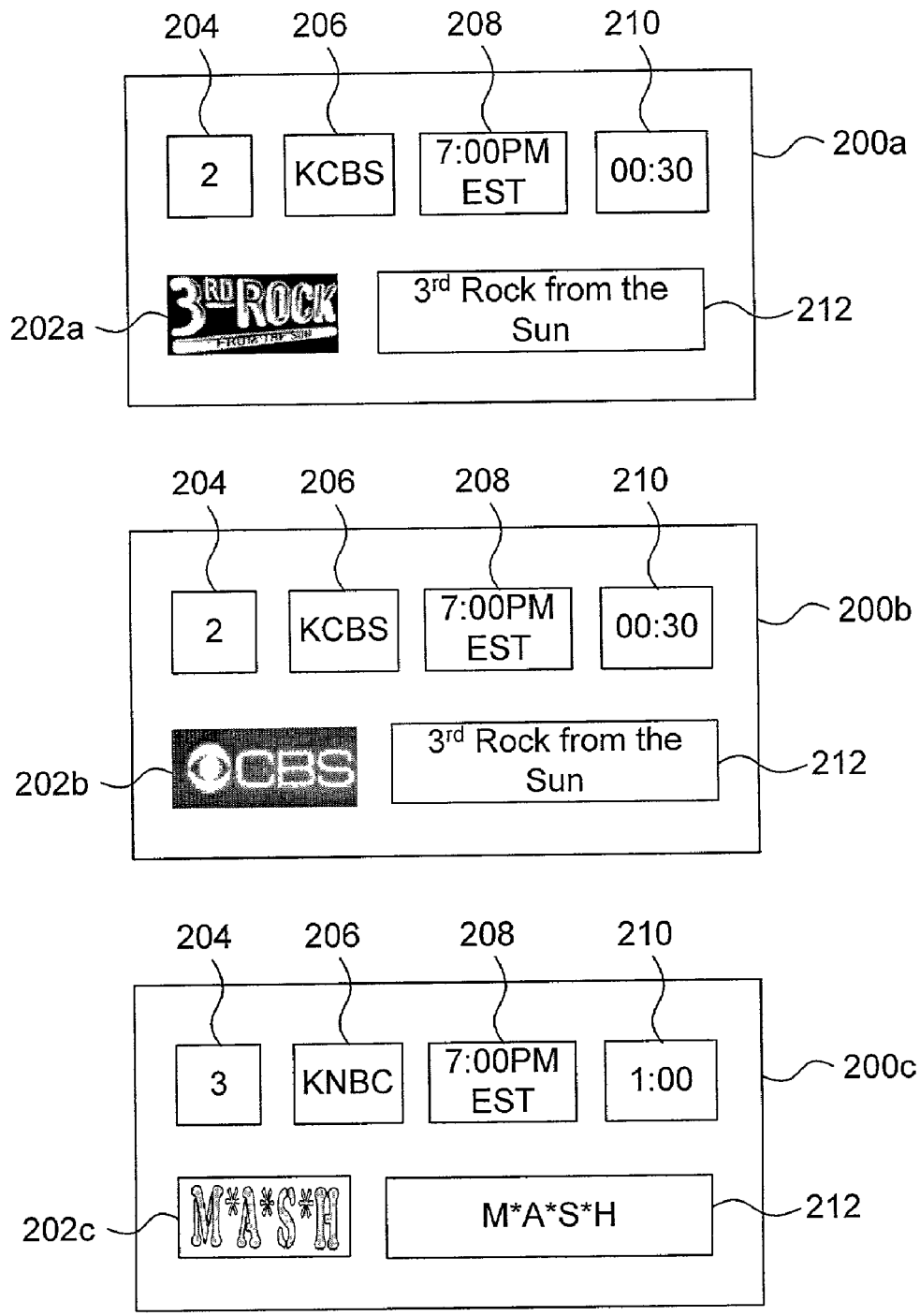
FIG. 2. is an illustration of a plurality of cards.

As shown in FIG. 2, each selectable option within the ITV system 100 may be associated with a card 200. A card 200 is an object or other suitable data structure that provides information about and/or access to an available option within an ITV system 100. A card 200 may be a container of all of the attributes, actions, and/or states needed to facilitate interaction with the option represented thereby. Cards 200 may be stored in any suitable format within a memory or disk drive of the ITV system 100.

Each card 200 may include a graphical representation 202 for display in the GUI 110, as described in detail below. The graphical representation 202 may include various types or combinations of artwork, digital photography, captured video frames, animations, or the like.

As depicted in FIG. 2, cards 200a-c may be used to represent television programs or channels. The television programs may be ongoing (live), upcoming, or previously-recorded. In addition to a graphical representation 202, such cards 200 may include, for instance, a channel number 204, a channel name or identifier 206, a starting time 208, a running time 210, and a text description 212. Of course, cards 200 representing other types of options may include additional or different types of information, such as audio/video clips, file or path names, network addresses (URLs), etc.

The graphical representations 202 associated with cards 200 may have different levels of specificity or granularity. For instance, a graphical representation 202a may correspond generally to a television series, e.g., "3$^{rd}$ Rock from the Sun", while another graphical representation 202b may correspond to a television station or network, e.g., "CBS". In other embodiments, a graphical representation 202 may correspond to a specific episode of a television series (e.g., a series premier), or even a product (purchase opportunity) associated with the television program. In still other embodiments, a generic graphical representation 202 may be provided, which may be overlaid by the channel number 204, text description 212, or other information, where a more specific card 200 is not available.

Cards 200 may be generated locally within an ITV system 100 or may be received via the broadband network using HTTP (hypertext transfer protocol), FTP (file transfer protocol), ATVEF (advanced television enhancement forum) triggers or other well-known protocols or techniques. In one embodiment, a card 200 may be received with data encoded in the vertical blanking interval (VBI) of a television signal. Additionally, information associated with cards 200 (e.g., channel number 204, starting time 208, running time 210) may be dynamically updated with information received in ATVEF triggers.

Figure 3:
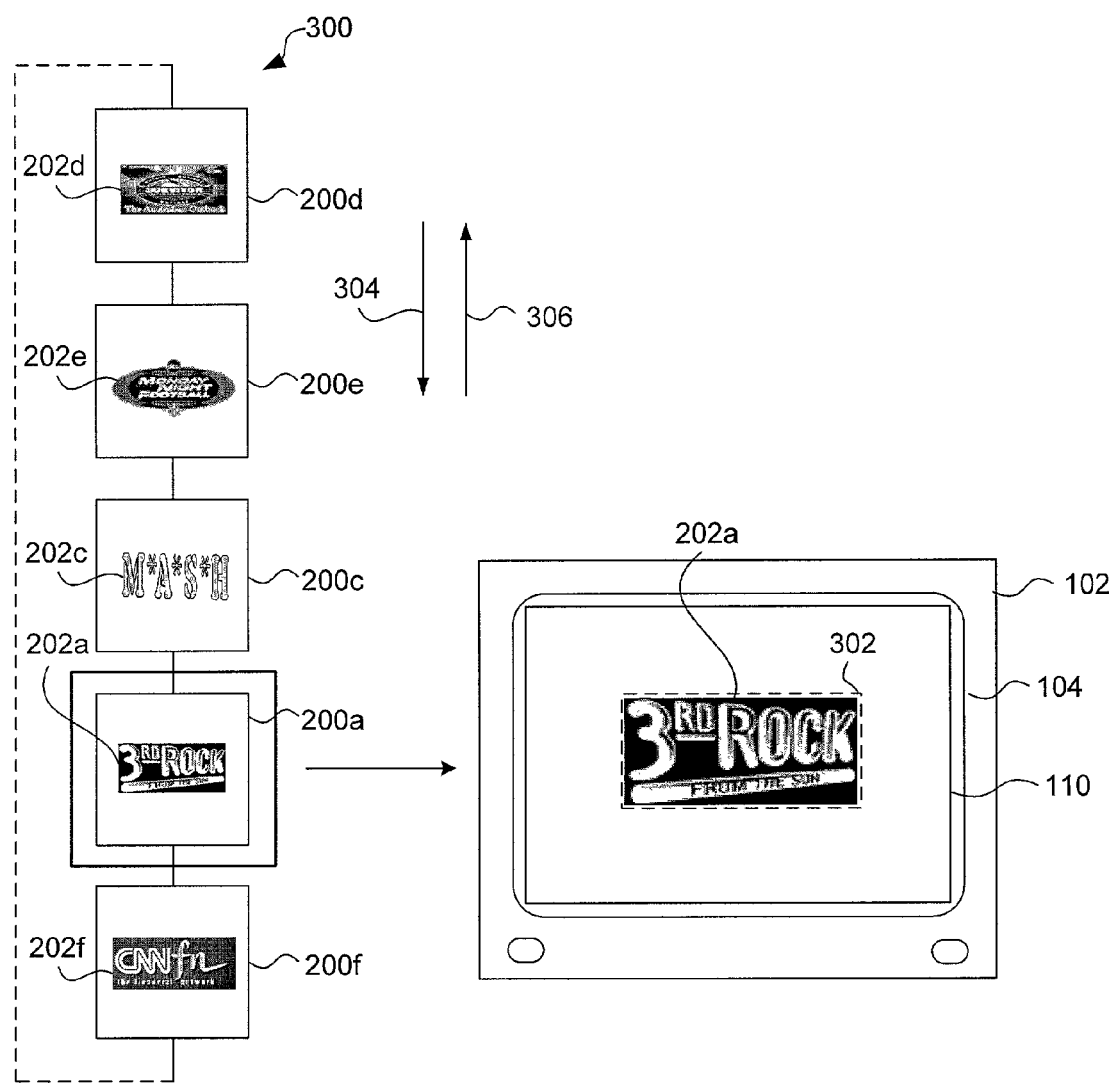
FIGS. 3-8 are illustrations of various techniques for focused navigation of a plurality of options within a user interface.

Referring to FIG. 3, a plurality of cards 200 may be linked or grouped together in a package or sequence 300. The sequence 300 may be circular (as depicted), linear, or configured in other ways. The sequence 300 may be linked in numerical order by channel number 204, in alphabetical order by the text description 212, or in other preset or user-defined ways. For instance, the sequence 300 may be determined based on one or a combination of other inputs, such as user profile information, user preferences, external events or data feeds (e.g., telephone rings, PVR notifications, alerts for external programming sources).

In the illustrated embodiment, one card 200a in the sequence 300 is active or in "focus". As shown, the active card 200a may be displayed within a focus area 302 of a GUI 110 displayed on the TV 102. For brevity, the phrase "displaying a card" refers herein to displaying a graphical representation 202 associated with the card 200. Other information associated with the card, e.g., the channel number 204 or text description 212, may or may not be displayed.

A focus area 302 is a single location of the GUI 110 at which the cards 200 are successively displayed (displayed one at a time in sequence). The focus area 302 may be located at a central or visually dominant location of the GUI 110, although the invention is not limited in this respect. As used herein, the term "focused navigation" refers to a technique of displaying a sequence 300 of cards 200 within a focus area 302.

In response to a single user action, the cards 200 in a sequence 300 are successively displayed within the focus area 302. Where the sequence 300 is circular, the successive display of cards 200 may continue indefinitely until halted by the user by a subsequent action, as described more fully below.

The single user action to initiate navigation may be pressing (or pressing and holding down) a button on the remote control 108. For example, the user may press the "Up" button 116 to initiate the successive display in a first direction within the sequence 300 (indicated by line 304), and press the "Down" button 118 to initiate navigation in the opposite direction (indicated by line 306). Alternatively, the user may speak a command into a microphone (either within the STB 106 or remote control 108) to initiate navigation. Of course, the user may initiate navigation in a variety of other ways within the scope of the invention, including by means of a keyboard or other input device.

In one embodiment, the sequence 300 of cards 200 is successively displayed at a rate selected by the user. For instance, initially pressing the "Up" button 116 may cause the sequence 300 to be displayed at a rate of two cards 200 per second. As the user continues to hold the "Up" button 116, the rate may increase gradually or in steps to any practical rate within the limit of a typical user's ability to recognize individual cards 200 when they are displayed. Many users are able to recognize individual cards 200 at a rate of seven or more cards 200 per second (420 per minute), facilitating rapid navigation of available options.

The cards 200, when displayed within the focus area 302, may be sufficiently large to permit user recognition from a comfortable viewing distance for the particular display screen 104. Thus, unlike PC icons, which typically occupy as little as 1/200 of the display area of the display screen 104, the displayed cards 200 (and the card 200 in the focus area 302 in particular) may occupy between 1/10 and 1/4 of the total display area.

When the user sees a card 200 being displayed of a channel or option that she desires to select or view, the user may take some additional action and the successive display of cards 200 is halted. For example, where navigation was initiated by pressing and holding down the "Up" button 116, the user may release the "Up" button 116 to discontinue navigation. In an alternative embodiment, where the successive display was initiated simply by pressing a button, the user may press the same or a different button to halt the successive display. Of course, the user may discontinue navigation in a variety of other ways within the scope of the invention.

If the user's reaction time is fast enough, the card 200 representing the desired channel remains displayed in the focus area 302 once navigation is discontinued. However, the user's reaction time may not be fast enough and one or more cards 200 may be subsequently displayed. In such a case, the user may manually backtrack to the desired card 200 by repeatedly activating a suitable control on the remote control 108. For example, briefly pressing the "Up" or "Down" buttons 116, 118 may result in the previous or next card 200, respectively, being displayed. Alternatively, as described in greater detail below, the ITV system 100 may attempt to determine the delay between the user recognizing the desired card 200 and taking the subsequent action and compensate for that delay by reverting to a previously-displayed card 200.

The user may select the channel or option associated with the displayed card 200 by taking a selection action. For instance, the user may press the "Select" button 124 on the remote control. Alternatively, the selection action may simply be waiting a set amount of time without activating any controls on the remote control 108.

The effect of activating the card 200 will vary dramatically depending on the type of card 200. For instance, in the case of a card 200 representing a live television program, the GUI 110 may be replaced by a full-size version of the program. Alternatively, activating a card 200 corresponding to a purchase opportunity may result in the display of a web browser directed to a particular website.

Figure 4:
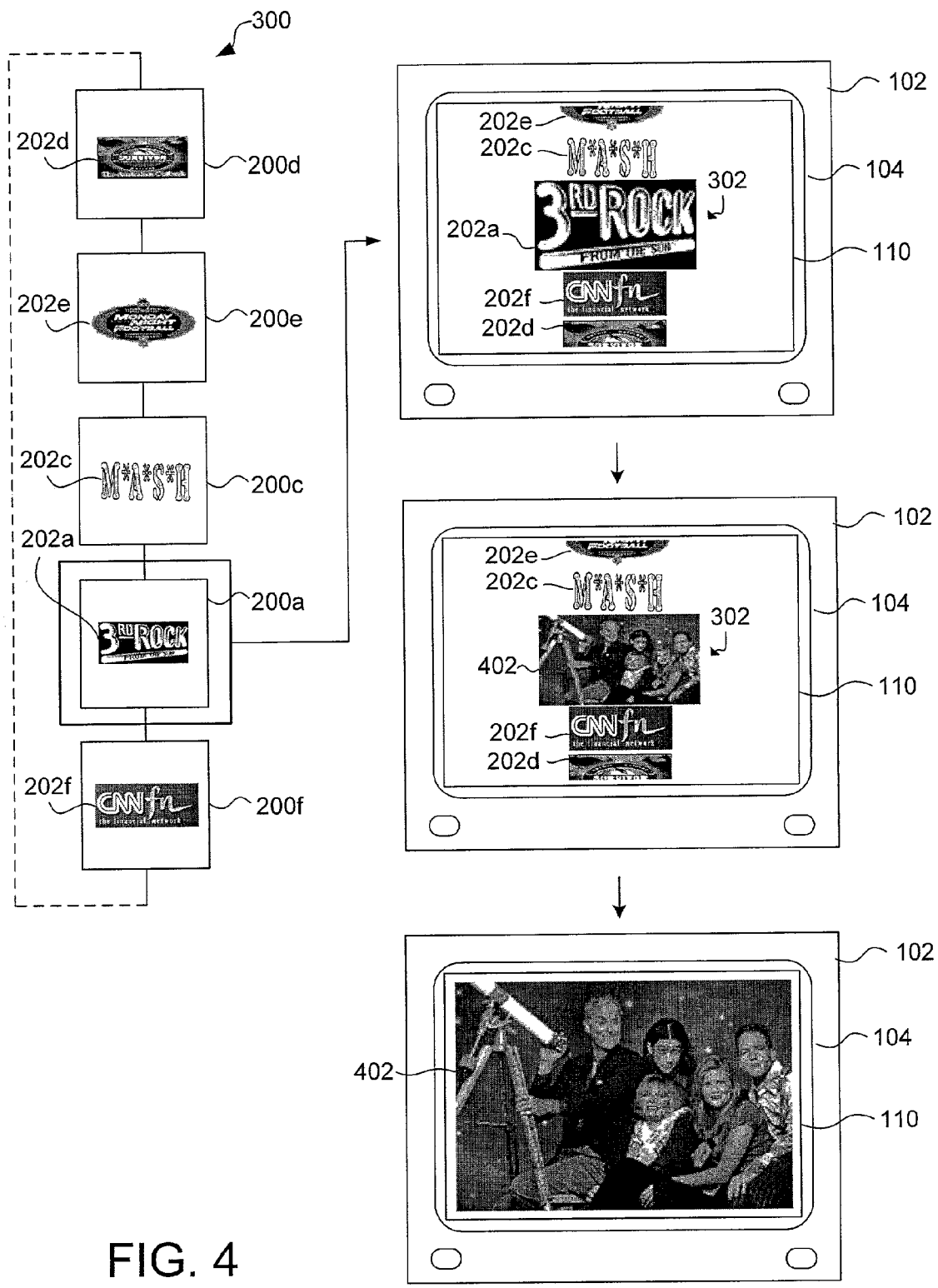

As shown in FIG. 4, one or more previous and next cards 200 within the sequence 300 may be displayed along an axis (not shown) of the GUI 110 to provide the user with a more complete navigational context within the sequence 300. In one embodiment, the axis is an imaginary line that extends across the GUI 110 in a particular direction and intersects the focus area 302. For example, at least a subset of the sequence 300 of cards 200 may be displayed along a vertical axis, with the active card 200a being displayed in the focus area 302. In alternative embodiments, the cards 200 may be displayed along horizontal or diagonal axes, or in other suitable ways.

Typically, one or more cards 200 in a sequence 300 are not displayed. These off-screen or hidden cards may be dynamically changed, replaced, or updated during navigation, e.g., a card 200 representing an advertisement may change from one sponsor to another.

When a user activates one of the navigation buttons of the remote control 108 (e.g., the "Up" or "Down" buttons 116, 118), the displayed cards 200 in the sequence 300 may be scrolled (e.g., shifted or cycled) downward or upward, respectively, with a new card (e.g., card 200c or 202f) entering the focus area 302. Alternatively, the "Left" or "Right" button 120, 122 may be used for the same purpose.

As depicted, the card 200a in the focus area 302 may be visually emphasized in various ways. For example, the card 200a may be enlarged relative to the other displayed cards 200. Alternatively, the card 200a may be animated, marked, illuminated, highlighted, or otherwise set apart from the other cards 200.

In certain embodiments, if the user allows a card 200 representing a live television program to remain in the focus area 302 for a certain amount of time (e.g., 2 seconds), the card 200a may be overlaid by a video window 402 showing the live television program. Furthermore, if the user continues to linger on the card 200a (or if the user presses the "Select" button 124), the video window 402 may be enlarged 402 to fill the entire display screen 104. Other types of cards 200 may exhibit different types of behaviors when the card 200 remains in the focus area 302 for an established period of time.

Where the cards 200 represent live television programs, a card 200 corresponding to the currently-tuned channel (at the current date and time) may be selected by default for display in the focus area 302 each time the GUI 110 is shown. This may occur, for instance, when the user is watching TV and presses a button (such as the "Select" button 124) in order to display the GUI 110. Additionally, an indication of the currently-displayed card 200 in the focus area 302 may be stored in non-volatile memory or otherwise maintained such that if a reset condition occurs (e.g., the STB 106 is rebooted or reset after a power loss, etc.) the last-displayed card 200 may be restored to the focus area 302.

Figure 5:
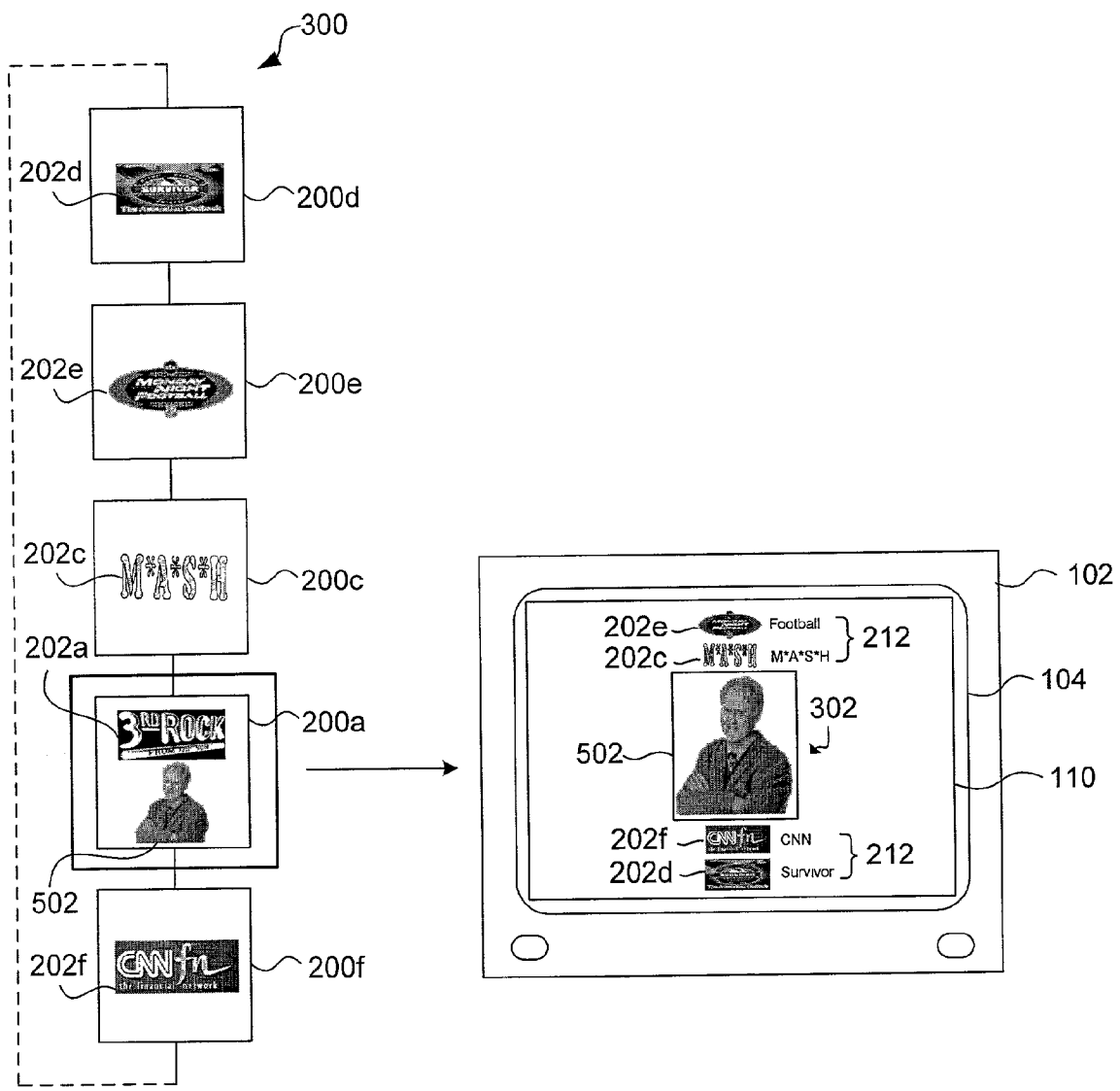

As shown in FIG. 5, cards 200 may include one or more alternative graphical representations 502, which may be displayed when the card 200 enters the focus area 302. As depicted, cards 200c-f displayed outside of the focus area 302 are shown using a first graphical representation 202c-f. However, when the card 200a enters the focus area 302, the alternative graphical representation 502 is shown. Additionally, cards 200 outside of the focus area 302 may be displayed in a reduced-size format with text descriptions 212.

Figure 6:
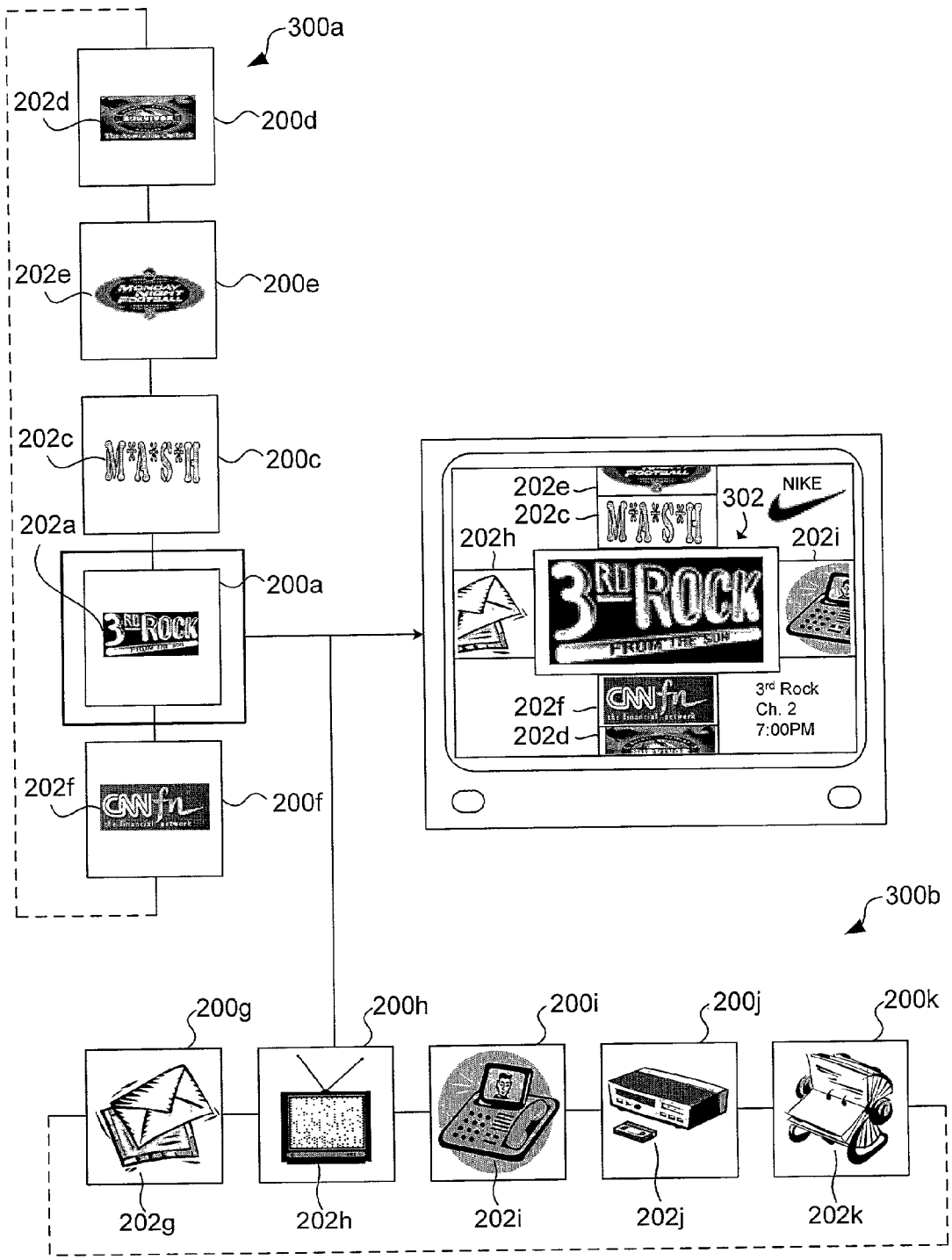

As shown in FIG. 6, multiple sequences 300a-b including different types of cards 200 may be displayed simultaneously. For instance, one or more cards 200 from a sequence 300a representing television programs may be displayed as described in reference to FIG. 4. In addition, one or more cards 200 from a sequence 300b representing interactive channels, applications, or digital media, may also be displayed.

As illustrated, the second sequence 300b may be displayed horizontally, perpendicular to the first sequence 300a, such that the sequences 300a-b intersect at (and define) the focus area 302. Any number of sequences 300 may be displayed on the GUI 110 simultaneously. Of course, the selection of vertical and horizontal for the sequences 300a-b is merely exemplary and not required.

In the depicted embodiment, the "Up" and "Down" buttons 116, 118 may be used to shift or cycle the vertically-displayed sequence 300a within the GUI 110 in order to bring one of the corresponding cards 200a-e into the focus area 302. Likewise, the "Left" and "Right" buttons 120, 122 may be used to shift or cycle the horizontally-displayed sequence 300b to bring one of the corresponding cards 200g-k into the focus area 302.

In one implementation, bringing a card 200 from one sequence 300 into the focus area 302 will determine or change which other sequence 300 is displayed. For example, bringing the card 200h (TV shape) from the horizontal sequence 300b into focus may result in the vertical sequence 300a (television programs) being displayed. Alternatively, bringing the card 200g (envelope shape) into focus may result in a vertical sequence 300 (not shown) corresponding to e-mail messages or contacts. Likewise, bringing the card 200i (videophone shape) into focus may result in a vertical sequence 300 of a videoconferencing buddy list, while the card 200j (VCR shape) may display a vertical sequence 300 of television programs recorded by a PVR. In alternative embodiments, a selection from a vertical sequence 300 may affect which horizontal sequence 300 is displayed.

Figure 7:
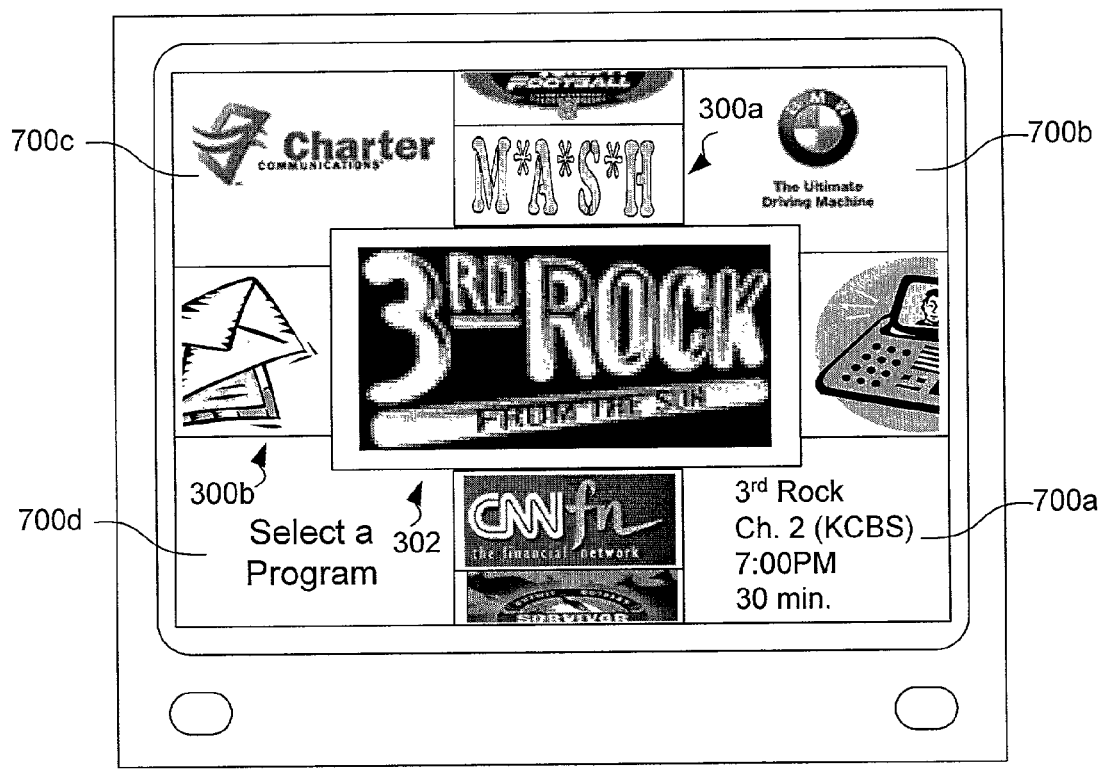

As shown in FIG. 7, the intersection of two displayed sequences 300a-b may generate quadrants 700 that may be used for various purposes. In one embodiment, the quadrants 700 are context-sensitive regions that display supplemental information, advertising, or the like, depending on the card 200 in the focus area 302. In other embodiments, one or more quadrants 700 may display information targeted to the user based on user profile information within the ITV system 100.

In the depicted embodiment, the lower right quadrant 700a may contain detailed information about the card 200 being displayed in the focus area 302. In the case of a card 200 representing a television program, the quadrant 700a may display information taken from the channel number 204, channel name or identifier 206, starting time 208, running time 210, and/or text description 212 associated with the card 200.

The upper right quadrant 700b may include context-sensitive, context-insensitive, or user-targeted information. For example, in an episode of "3$^{rd}$ Rock from the Sun" featuring Dick Solomon driving a new BMW, a corresponding advertisement may be shown. The advertisement may be displayed in response to receipt of an ATVEF trigger, although other mechanisms may be used within the scope of the invention.

The upper left quadrant 700c may be used for branding purposes. For instance, as shown in FIG. 7, the quadrant 700c may show a logo for a cable or satellite provider associated with the ITV system 100. In certain implementations, the quadrant 700c may be context-sensitive, displaying branding corresponding to the particular vertical and/or horizontal sequences 300a-b or cards 200 being displayed.

Finally, the lower left quadrant 700d may be used to display system notes and instructional text. For example, where the user is navigating a sequence 300a of cards 200 corresponding to television programs, instructional text may be provided that prompts the user to select a television program.

The size of the quadrants 700 may vary depending, for instance, on the location of the intersection of the displayed sequences 300a-b. If the intersection is near the center of the GUI 110, the quadrants may be equal in size; otherwise, the relative sizes of the quadrants 700 may vary.

In alternative embodiments, a single vertical or horizontal sequence 300a-b may result in the creation of hemispheres (not shown) rather than quadrants 700. In still other embodiments, multiple vertical or horizontal sequences 300a-b may result in the creation of any number of context-sensitive regions.

Figure 8:
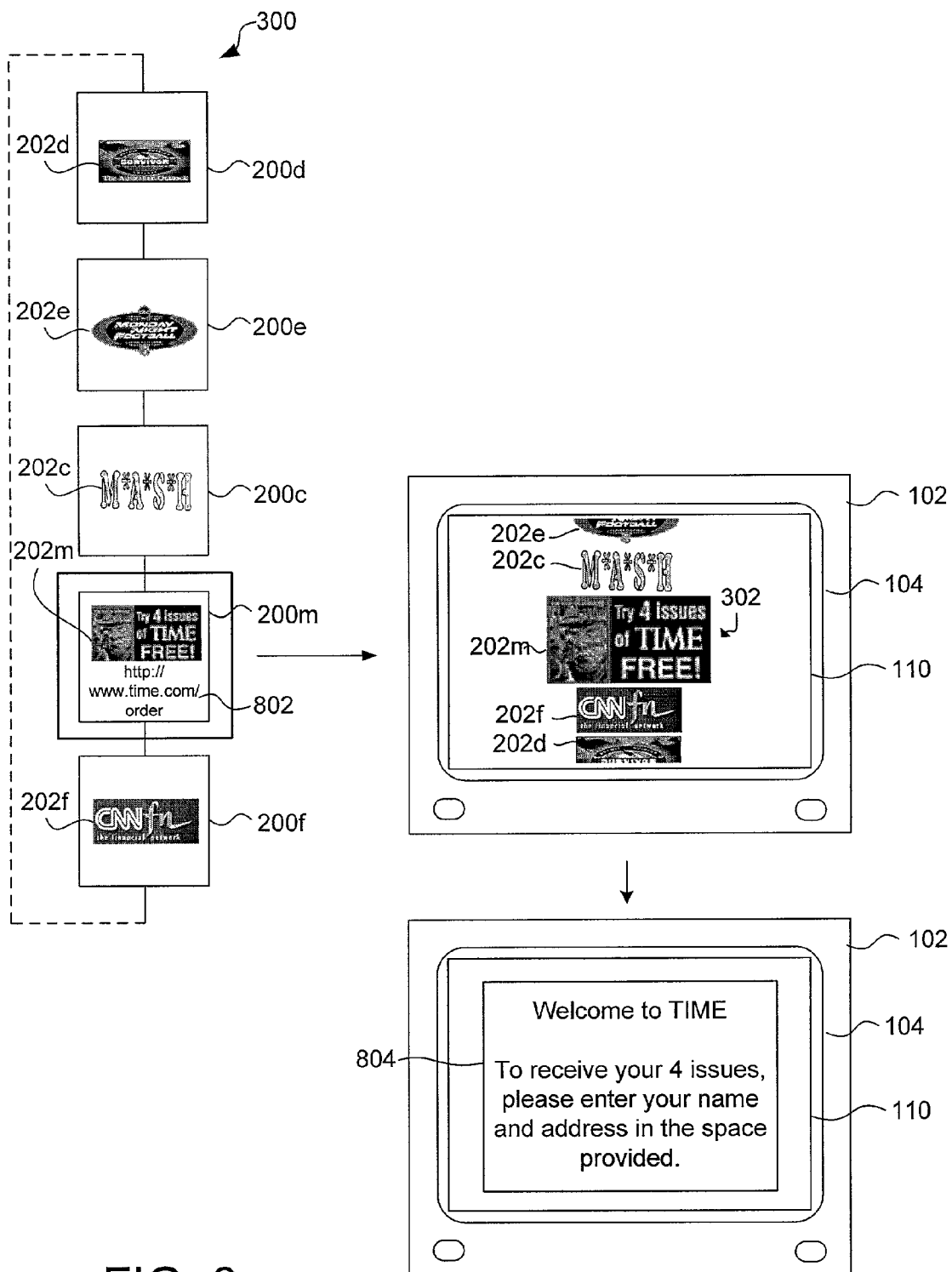

As illustrated in FIG. 8, different types of cards 200 may be included within a single sequence 300. For example, cards 200c-f may correspond to television programs, while card 200m represents a purchase opportunity. In the depicted embodiment, card 200m includes a graphical representation 202m (advertisement), as well as a link or network address 802, such as a uniform resource locator (URL), to a commercial website.

If the card 200m remains in the focus area 302 for a sufficiently long period, or if the user presses the "Select" button 124, the displayed sequence 300 may be replaced by a web browser 804, which is automatically directed to the network address 802 associated with the card 200m. Thereafter, the user may elect to proceed with the purchase opportunity or return to the displayed sequence 300 of cards 200.

Figure 9:
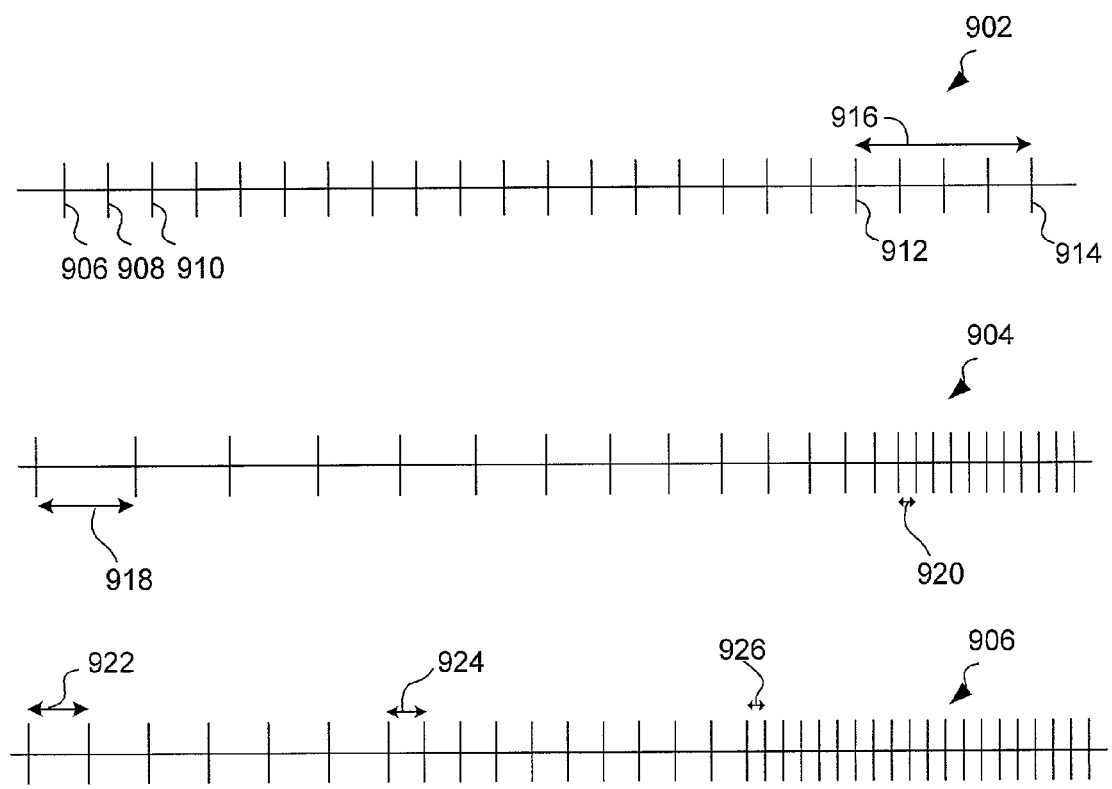
FIG. 9 is a timing diagram for displaying a sequence of cards.

Referring to FIG. 9, there are shown three timing diagrams 902, 904, 906 illustrating the successive display of cards 200 according to embodiments of the invention. Each vertical line within the timing diagrams represents a moment in time at which a particular card 200 is displayed. In diagram 902, after a single user action, cards 200 are successively displayed at moments 906, 908, 910, and so on. When the user takes some additional action to discontinue navigation, the successive display of cards 200 may be halted at moment 912.

In certain instances, the user's delayed response may be automatically compensated for by reverting to a previously displayed card 200 once the user halts the successive display. For example, if a card 200 representing a desired channel is displayed within the GUI 110 at moment 912, but the user takes the additional action to discontinue navigation at moment 914, the ITV system 100 may be configured to automatically revert to the card 200 displayed a suitable amount of time 916 before the action was taken. The amount of time may be preset or user-defined, or may be calculated based on historical user reaction times.

The rate at which the cards 200 are successively displayed may be increased in response to the user taking a suitable action. For example, as shown in timing diagram 904, the rate at which cards 200 are successively displayed may gradually increase from a minimum rate 918 to a maximum rate 920 (preferably at or below the user's image recognition limit). Alternatively, as shown in timing diagram 906, the display rate may increase from a minimum rate 922 to an intermediate rate 924 to a maximum rate 926 according to a stepwise function. The user action to increase the display rate may take many forms, such as holding down a button on the remote control 108 for a set amount of time. In such case, the rate may be increased based on how long the button is held down. Alternatively, the user may increase the display rate by repeatedly pressing a button on the remote control 108, in which case the rate may be increased each time the button is pressed.

Figure 10:
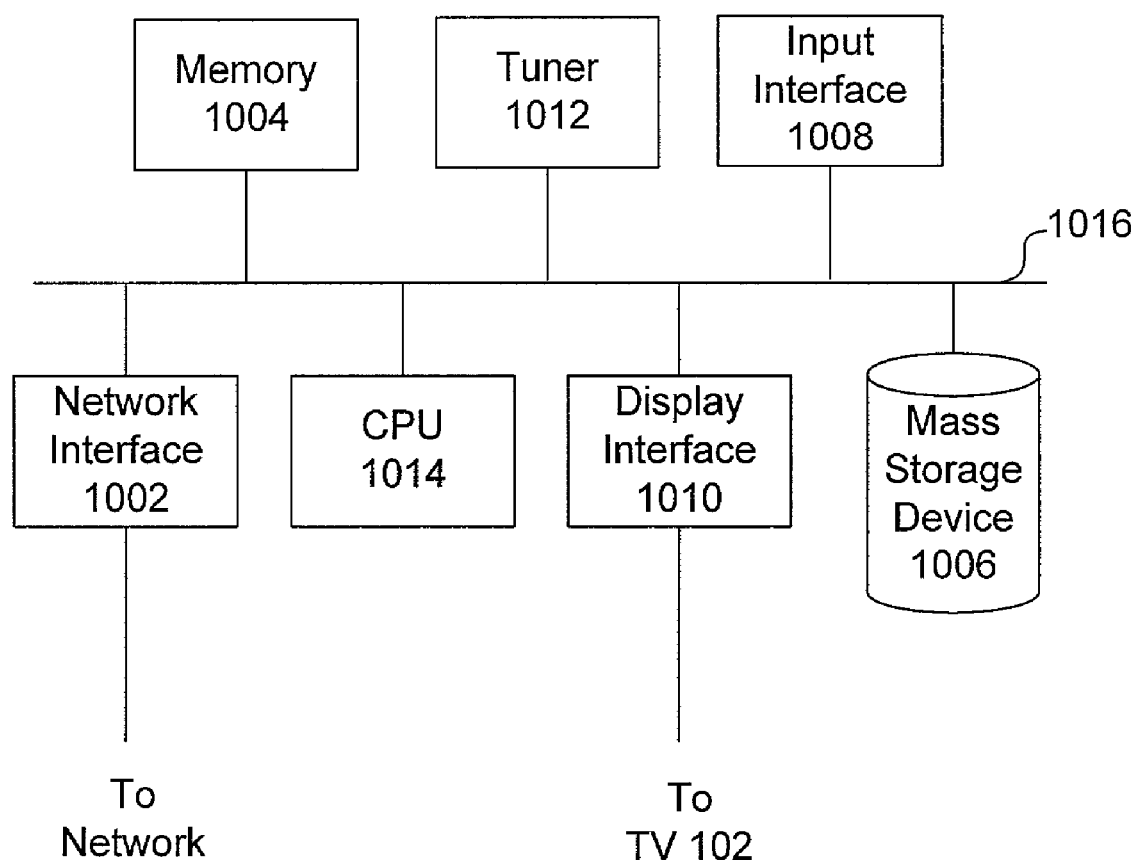
FIG. 10 is a schematic block diagram of a set-top box (STB)

FIG. 10 is a schematic block diagram of an STB 106 according to an embodiment of the invention. The illustrated components may be logical or physical and may be implemented using any suitable combination of hardware, software, and/or firmware.

In one configuration, the STB 106 includes a network interface 1002 for communicating with a broadband network, such as a cable television network or a DBS (Direct Broadcast Satellite) network. The network interface 1002 may conform to the DOCSIS (Data Over Cable Service Interface Specification) or DAVIC (Digital Audio-Visual Council) cable modem standards. Additionally, the network interface 1002 may include standard circuitry for receiving MPEG (Moving Picture Experts Group) streams including multiplexed television programs and data from the broadband network. One or more sequences 300 of cards 200 may be received by the interface 1002 from a server accessible via the broadband network or the Internet.

The STB 106 further includes a memory 1004, such as a random access memory (RAM) and/or read-only memory (ROM). The memory 1004 may store an operating system (OS) for the STB 106 (e.g., Windows CE® or Linux®), application program code, and various types of data. In one embodiment, the memory 1004 stores one or more sequences 300 of cards 200. In other embodiments, the sequences 300 may be stored within a mass storage device 1006, such as a hard disk drive, optical storage device, or the like.

An input interface 1008 may be provided for receiving commands from an input device, such as a remote control 108. In one embodiment, the input interface 1008 may include or be associated with the wireless receiver 114 described in connection with FIG. 1. The input interface 1008 may detect a single user action for initiating navigation, such as the user pressing the "Up" or "Down" buttons 116, 118 on the remote control 108.

The STB 106 may further include a display interface 1010 for generating a GUI 110 on an attached TV 102 or other display device. In addition, the display interface 1010 may be responsible for successively displaying cards 200 from one or more stored sequences 300 in a focus area 302 of the GUI 110 in response to the single user action being detected by the input interface 1008, as previously described. Likewise, the display interface 1010 may be responsible for halting the successive display in response to detection of a subsequent user action.

A tuner 1012 may be included for demodulating and demultiplexing selected MPEG streams received by the STB 106 from the broadband network. The tuner 1012 may be used to tune to a particular television program in response to a user selection of a card 200, e.g., in response to the user pressing the "Select" button 124 or when the user "lingers" on a card 200 in the focus area 302.

A CPU 1014 controls the operation of the STB 106, including the other components described above, which may be in electrical communication with the CPU 1014 via a bus 1016. The CPU 1014 may be embodied as a microprocessor, a microcontroller, a digital signal processor (DSP) or other device known in the art. For instance, the CPU 1014 may be embodied as an Intel® x86 processor. The CPU 1014 may perform logical and arithmetic operations based on program code stored within the memory 1004 or the mass storage device 1006.

Of course, FIG. 10 illustrates only one possible configuration of an STB 106. Those skilled in the art will recognize that various other architectures and components may be provided within the scope of the invention. In addition, various standard components are not illustrated in order to avoid obscuring aspects of the invention.

Figure 11:
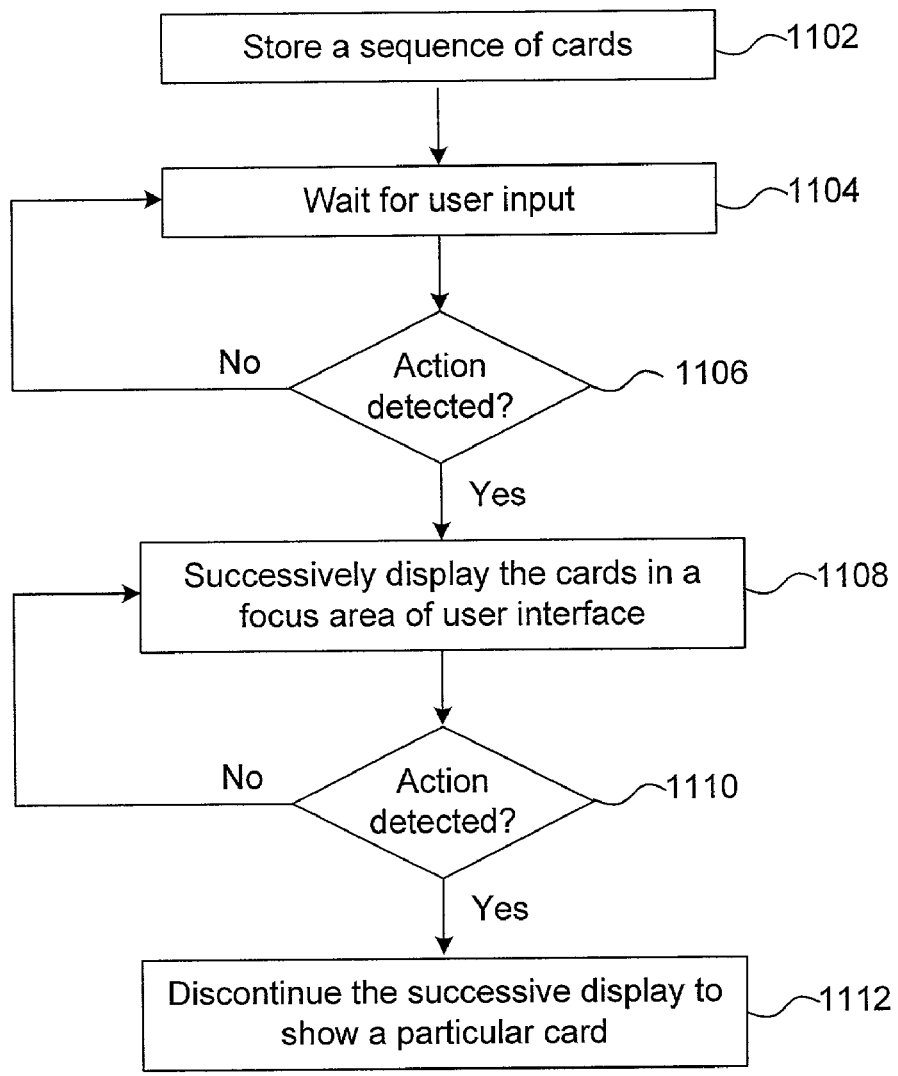
FIG. 11 a flowchart of a method for focused navigation of a plurality of options within a user interface.

Referring to FIG. 11, there is shown a flowchart of a method 1100 for focused navigation of a plurality of options within a GUI 110. The method 1100 begins by storing 1102 a sequence 300 of cards 200 representing channels or other available options within an ITV system 100.

In one configuration, the method 1100 waits 1104 for user input. When a single user action is detected 1106, as previously discussed, the cards 200 from the sequence 300 are successively displayed 1108 in a focus area 302 of the GUI 110. This successive display continues until a subsequent user action is detected 1110, at which point the successive display is discontinued and a single card 200 corresponding to a selected option is displayed 1112 within the focus area 302.

Thereafter, depending on the particular type of card 200, various actions may be taken if the user actively selects the card 200 (e.g., presses the "Select" button 124 on the remote control 108) or waits beyond an established time period to either select the card 200, continue navigation, or take some other action. For example, a card 200 in the focus area 302 may be replaced by a video window 402 showing a live television program after a period of inactivity (lingering) by the user.

In view of the foregoing, the present invention offers a number of advantages not available in conventional approaches. Cards representing available channels or options within an ITV system may be successively and rapidly displayed within a focus area. Because navigation is initiated by a single user action, the user need not repeatedly press a button to display each channel, as is often the case with conventional TV or ITV interfaces. This greatly increases navigation speed, reduces wear on the remote control, and reduces the likelihood of discomfort or injury to the user's hand.

Likewise, because the cards are all displayed within a single area of the user interface (i.e. the focus area), the cards may be displayed at a relatively high rate of speed, while still being within the user's image recognition threshold. Typically, the focused navigation technique of the claimed invention allows a user to more quickly and efficiently locate and select a desired option than conventional approaches where a large number of available options exist.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for navigating a plurality of options within a user interface, the method comprising:

displaying on a display screen a first sequence of scrollable cards along a first axis of the user interface, each card in the first sequence graphically representing a different interactive application program such that each card in the first sequence is positioned adjacent to at least one other card in the first sequence that represents a different interactive application program;

allowing a user to scroll the first sequence of cards along the first axis through a focus area of the user interface;

in response to a first card from the first sequence representing a first interactive application program being scrolled into the focus area without an additional selection action with respect to the first card, and while continuing to display the first sequence of cards along the first axis, displaying a second sequence of cards along a second axis of the user interface, the second axis being perpendicular to the first axis and intersecting the first axis at the same focus area such that the first sequence and the second sequence visually divide the user interface into four quadrants and such that none of the cards that visually divide the user interface are scrollable into any of the four quadrants, each card in the second sequence graphically representing a different option associated with the first interactive application program, wherein cards in the first sequence are only scrollable along the first axis, and wherein cards in the second sequence are only scrollable along the second axis;

in response to a second card from the first sequence representing a second interactive application program being scrolled into the focus area without an additional selection action with respect to the second card, replacing the second sequence of cards with a third sequence of cards along the second axis, each card in the third sequence graphically representing a different option associated with the second interactive application program, the options of the second interactive application program being associated with a different media format or communication format than the options of the first interactive application program, wherein only the options of the second interactive program appear on the user interface immediately after the second sequence of cards has been replaced by the third sequence of cards such that only options associated with a single media format or communication format are displayed simultaneously on the user interface; and allowing a user to scroll the third sequence of cards along the second axis through the same focus area, wherein a representation of only one option at a time is scrolled through the focus area.

2. The method of claim 1, wherein the single user action comprises pressing and holding down a control on a remote control.

3. The method of claim 2, wherein the subsequent user action comprises releasing the control on the remote control.

4. The method of claim 1, wherein the single user action comprises activating a first control on a remote control.

5. The method of claim 4, wherein the subsequent user action comprises reactivating the first control.

6. The method of claim 4, wherein the subsequent user action comprises activating a second control on the remote control.

7. The method of claim 1, further comprising:
displaying next to a card in the focus area at least one previous card in the sequence.

8. The method of claim 7, further comprising:
displaying next to the card in the focus area at least one subsequent card in the sequence; wherein the at least one previous and subsequent cards are displayed on opposite sides of the card in the focus area.

9. The method of claim 1, further comprising:
displaying next to a card in the focus area at least one subsequent card in the sequence.

10. The method of claim 1, wherein the focus area is located at a center portion of the user interface.

11. The method of claim 1, wherein the cards are successively displayed at a user-selected rate.

12. The method of claim 11, further comprising:
increasing the rate at which the cards are successively displayed based on how long the user holds down a button on the remote control.

13. The method of claim 11, further comprising:
increasing the rate at which the cards are successively displayed based on how many times the user presses a button on the remote control.

14. The method of claim 1, wherein each card comprises a graphical image for display in the focus area of the user interface.

15. The method of claim 1, wherein at least one card represents and provides access to a television program.

16. The method of claim 15, wherein the television program is one of a live television program, an upcoming television program, and a recorded television program.

17. The method of claim 15, wherein at least one card representing a television program comprises at least one of a channel number, a starting time, a running time, and a text description.

18. The method of claim 15, further comprising:
overlaying the card representing the selected option with a corresponding live television program after the card remains in the focus area for an established time period.

19. The method of claim 15, further comprising:
overlaying the user interface with a corresponding live television program in response to a selection action by the user.

20. The method of claim 18, further comprising:
overlaying the user interface with a corresponding live television program in response to the user taking no action for an established time period.

21. The method of claim 14, wherein a graphical image graphically represents a television program with a level of specificity selected from the group consisting of episode, series, and channel.

22. The method of claim 1, wherein at least one card represents and provides access to a purchase opportunity.

23. The method of claim 1, wherein at least one card comprises network address, the method further comprising:
displaying a browser in the user interface directed to the network address.

24. The method of claim 1, wherein at least one card represents and provides access to a media file.

25. The method of claim 1, wherein at least one card represents and provides access to an application selected from the group consisting of a web browser, an e-mail program, a videophone, a personal video recorder, and a directory of contacts.

26. The method of claim 1, wherein at least two cards within a sequence represent different types of options selected from the group consisting of a television program, a purchase opportunity, an application program, and a media file.

27. The method of claim 1, further comprising:
replacing a first card in the sequence with a second card while the first card is not currently being displayed in the focus area.

28. The method of claim 27, wherein the first and second cards represent advertisements by different sponsors.

29. The method of claim 1, further comprising:
selecting a card for display in the focus area based on a currently-tuned channel and an indication of the date and time.

30. The method of claim 1, further comprising:
storing an indication of a card being currently displayed in the focus area; and
restoring the indicated card to the focus area after a reset condition.

31. The method of claim 1, further comprising:
receiving at least one card with data encoded in a vertical blanking interval (VBI) of a television signal.

32. The method of claim 1, further comprising:
updating information within at least one card based on information received within an ATVEF trigger.

33. A system for navigating a plurality of options within a user interface, the system comprising:
an input interface for detecting user actions; and
a display interface for:

displaying a first sequence of scrollable cards along a first axis of the user interface, each card in the first sequence graphically representing a different interactive application program such that each card in the first sequence is positioned adjacent to at least one other card in the first sequence that represents a different interactive application program;

allowing a user to scroll the first sequence of cards along the first axis through a focus area of the user interface;

displaying, in response to a first card from the first sequence representing a first interactive application program being scrolled into the focus area without an additional selection action with respect to the first card, and while continuing to display the first sequence of cards along the first axis, a second sequence of cards along a second axis of the user interface, the second axis being perpendicular to the first axis and intersecting the first axis at the same focus area such that the first sequence and the second sequence visually divide the user interface into four quadrants and such that none of the cards that visually divide the user interface are scrollable into any of the four quadrants, each card in the second sequence graphically representing a different option associated with the first interactive application program, wherein cards in the first sequence are only scrollable along the first axis, and wherein cards in the second sequence are only scrollable along the second axis;

replacing, in response to a second card from the first sequence representing a second interactive application program being scrolled into the focus area without an additional selection action with respect to the second card, the second sequence of cards with a third sequence of cards along the second axis, each card in the third sequence graphically representing a different option associated with the second interactive application program, the options of the second interactive application program being associated with a different media format or communication format than the options of the first interactive application program, wherein only the options of the second interactive program appear on the user interface immediately after the second sequence of cards has been replaced by the third sequence of cards such that only options associated with a single media format or communication format are displayed simultaneously on the user interface; and allowing a user to scroll the third sequence of cards along the second axis through the same focus area, wherein a representation of only one option at a time is scrolled through the focus area.

34. The system of claim 33, further comprising:
a tuner for tuning to a television program represented by a card displayed within the focus area; wherein the display interface is further configured to overlay a card within the focus area with a corresponding live television program after the card remains in the focus area for an established time period.

35. The system of claim 33, further comprising:
a tuner for tuning to a television program represented by a card displayed within the focus area; wherein the display interface is further configured to overlay the user interface with a corresponding live television program in response to detection of a selection action by a user.

36. The system of claim 33, further comprising:
a network interface for receiving at least one sequence of cards from a broadband network.

37. A system for navigating a plurality of options within a user interface, the system comprising:

means for displaying a first sequence of scrollable cards along a first axis of the user interface, each card in the first sequence graphically representing a different interactive application program such that each card in the first sequence is positioned adjacent to at least one other card in the first sequence that represents a different interactive application program;

means for allowing a user to scroll the first sequence of cards along the first axis through a focus area of the user interface;

means for displaying, in response to a first card from the first sequence representing a first interactive application program being scrolled into the focus area without an additional selection action with respect to the first card, and while continuing to display the first sequence of cards along the first axis, a second sequence of cards along a second axis of the user interface, the second axis being perpendicular to the first axis and intersecting the first axis at the same focus area such that the first sequence and the second sequence visually divide the user interface into four quadrants and such that none of the cards that visually divide the user interface are scrollable into any of the four quadrants, each card in the second sequence graphically representing a different option associated with the first interactive application program, wherein cards in the first sequence are only scrollable along the first axis, and wherein cards in the second sequence are only scrollable along the second axis;

means for replacing, in response to a second card from the first sequence representing a second interactive application program being scrolled into the focus area without an additional selection action with respect to the second card, the second sequence of cards with a third sequence of cards along the second axis, each card in the third sequence graphically representing a different option associated with the second interactive application program, the options of the second interactive application program being associated with a different media format or communication format than the options of the first interactive application program, wherein only the options of the second interactive program appear on the user interface immediately after the second sequence of cards has been replaced by the third sequence of cards such that only options associated with a single media format or communication format are displayed simultaneously on the user interface; and means for allowing a user to scroll the third sequence of cards along the second axis through the same focus area, wherein a representation of only one option at a time is scrolled through the focus area.

38. An article of manufacture comprising:
a computer-readable medium comprising program instructions for causing a computer to perform a method for navigating a plurality of options within a user interface, the method comprising:

displaying a first sequence of scrollable cards along a first axis of the user interface, each card in the first sequence graphically representing a different interactive application program such that each card in the first sequence is positioned adjacent to at least one other card in the first sequence that represents a different interactive application program;

allowing a user to scroll the first sequence of cards along the first axis through a focus area of the user interface;

in response to a first card from the first sequence representing a first interactive application program being scrolled into the focus area without an additional selection action with respect to the first card, and while continuing to display the first sequence of cards along the first axis, displaying a second sequence of cards along a second axis of the user interface, the second axis being perpendicular to the first axis and intersecting the first axis at the same focus area such that the first sequence and the second sequence visually divide the user interface into four quadrants and such that none of the cards that visually divide the user interface are scrollable into any of the four quadrants, each card in the second sequence graphically representing a different option associated with the first interactive application program wherein cards in the first sequence are only scrollable along the first axis, and wherein cards in the second sequence are only scrollable along the second axis;

in response to a second card from the first sequence representing a second interactive application program being scrolled into the focus area without an additional selection action with respect to the second card, replacing the second sequence of cards with a third sequence of cards along the second axis, each card in the third sequence graphically representing a different option associated with the second interactive application program, the options of the second interactive application program being associated with a different media format or communication format than the options of the first interactive application program, wherein only the options of the second interactive program appear on the user interface immediately after the second sequence of cards has been replaced by the third sequence of cards such that only options associated with a single media format or communication format are displayed simultaneously on the user interface; and allowing a user to scroll the third sequence of cards along the second axis through the same focus area, wherein a representation of only one option at a time is scrolled through the focus area.

* * * * *

UNITED STATES PATENT AND TRADEMARK OFFICE
CERTIFICATE OF CORRECTION

PATENT NO. : 7,594,246 B1  
APPLICATION NO. : 10/108178  
DATED : September 22, 2009  
INVENTOR(S) : Billmaier et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1759 days.

Signed and Sealed this

Twenty-eighth Day of September, 2010

David J. Kappos  
*Director of the United States Patent and Trademark Office*